United States Patent [19]

Jesson

[11] Patent Number: 4,725,175
[45] Date of Patent: Feb. 16, 1988

[54] GROOVE POINT SCREW
[75] Inventor: George Jesson, Campbellsville, Ky.
[73] Assignee: USM Corporation, Farmington, Conn.
[21] Appl. No.: 910,285
[22] Filed: Sep. 17, 1986

Related U.S. Application Data

[63] Continuation of Ser. No. 817,303, Jan. 9, 1986, abandoned.

[51] Int. Cl.$^4$ .............................................. F16B 25/00
[52] U.S. Cl. ...................................... 411/387; 408/227
[58] Field of Search ................ 411/387; 408/224, 227, 408/223, 230

[56] References Cited

U.S. PATENT DOCUMENTS

| 305,625 | 9/1884 | Newey | 408/230 |
|---|---|---|---|
| 3,199,381 | 8/1965 | Mackey | 77/70 |
| 3,395,603 | 8/1968 | Skierski | 411/387 |
| 3,463,045 | 8/1969 | Prescott | 411/387 |
| 3,550,255 | 8/1968 | Skierski | 411/387 |
| 4,114,508 | 9/1978 | Jeal | 408/228 |
| 4,257,307 | 3/1981 | Regensburger | 408/228 |
| 4,295,768 | 10/1981 | Skierski | 411/387 |
| 4,599,024 | 7/1986 | Sano et al. | 408/228 |

FOREIGN PATENT DOCUMENTS

| 2901059 | 7/1979 | Fed. Rep. of Germany | 411/387 |
|---|---|---|---|
| 940206 | 10/1963 | United Kingdom . | |
| A2016314 | 9/1979 | United Kingdom . | |

OTHER PUBLICATIONS

SFS Koenig Brothers brochure (8 pages) dated 1985 submitted by applicant, Jul. 10, 1987.
SFS-Koenig Jerbin Oungstechnik brochure dated 1985.

Primary Examiner—James L. Ridgill, Jr.
Attorney, Agent, or Firm—Thomas S. Szatkowski

[57] ABSTRACT

A drilling and thread forming fastener is provided having a threaded shank and a pilot end.

A pair of cutting surfaces are provided on the pilot end, each surface terminating in a cutting edge having a linear groove, arcuate in cross-section disposed adjacent the cutting edge.

3 Claims, 8 Drawing Figures

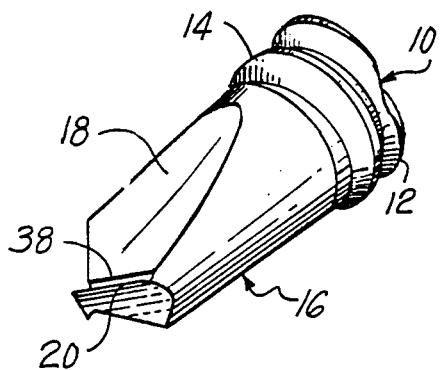
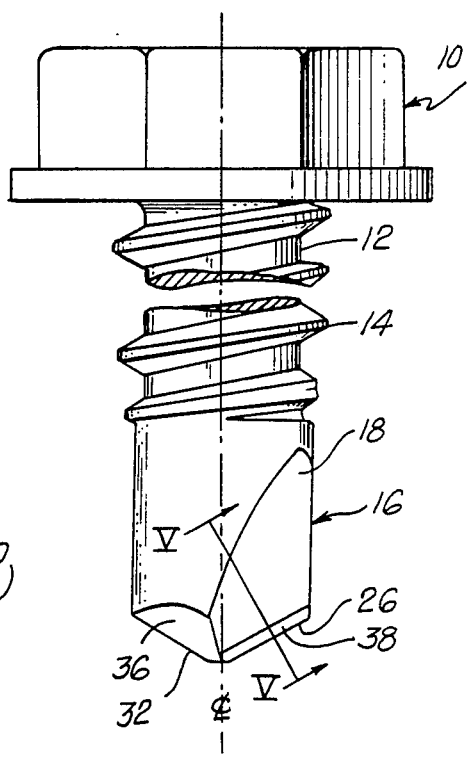
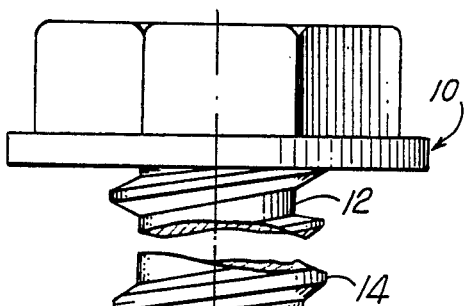
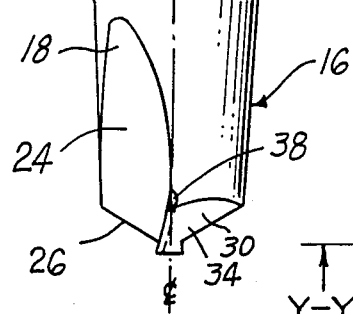
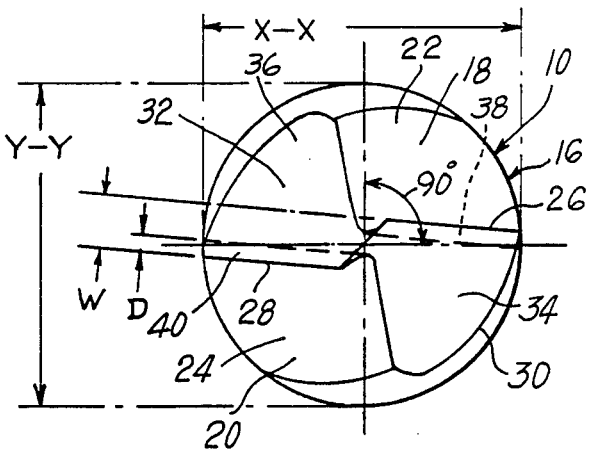

GROOVE POINT SCREW

This application is a continuation of application Ser. No. 817,303 filed Jan. 9, 1986, now abandoned.

BACKGROUND OF THE INVENTION

The present invention relates to a rotary threaded fastener of the self-drilling and threading type and more particularly to a fastener which is manufactured by a pair of forging dies.

Self-drilling and thread forming fasteners are well known in the art. Some of these fasteners are particularly adopted for manufacturer by a milling process, others for manufacture by a forging process which employs a pair of matched dies, and some are susceptible to manufacture by either process. A typical example of a type of drilling and thread forming fastener which is preferably formed by the forging process is shown in U.S. Pat. No. 3,395,603, issued Aug. 6, 1968 to E. J. Skierski and assigned to the assignee of the present invention. Fasteners manufactured in accordance with the teachings of the aforementioned patent have met with wide acceptance as they provide a fastener which is simple to use, requiring no pre-drilling of the structure to which it is assembled, and these fasteners have proven to be easy to manufacture by mass production techniques.

As the use of these self-drilling and thread forming fasteners has increased, the requirement for the reduction in drilling time of the fastener has become important, particularly in those instances such as automobile manufacture, metal building construction, etc. where a large number of these fasteners are employed, and in particular, where mass production lines are employed to produce the product. In developing an improved threaded fastener of the self-drilling and threading type, therefore, a decrease in drilling time has become an ever important factor in the design.

It is therefore an object of the present invention to provide a drilling and thread forming fastener which exhibits a decrease in drilling time over those drilling and thread forming fasteners of the prior art.

It is a further object of the present invention to provide a drilling and thread forming fastener wherein the fastener exhibits an improvement in drilling time, particularly in the initial stages of the drilling.

Yet another object of the invention is to provide a drilling and thread forming fastener which exhibits an overall improvement in performance over those drilling and thread forming fasteners of the prior art.

SUMMARY OF THE INVENTION

The aforementioned objects, and other objectives which will become apparent as the description proceeds, are accomplished by providing a drilling and thread forming fastener having a threaded shank and a pilot end having a pair of transverse axes intersecting at the centerline of the fastener. A pair of flutes extend longitudinallly over the pilot end to form a pair of cutting surfaces which in cross-section define one of said axes and each surface terminating in a cutting edge. The flutes further form a pair of lands concentric with the centerline of the shank, each of which has an arcuate surface extending outwardly to define the other of the axes at its radial extent on any cross-section of the pilot end, and a linear groove arcuate in cross-section is formed in each cutting surface adjacent the cutting edge.

In a more detailed sense, the drilling and thread forming fastener may be provided with an axis defined by the cutting surface which is of a greater magnitude than the axis defined by the arcuate surfaces of the lands.

A drilling and thread forming fastener may also be provided wherein the groove extends over the entire length of the cutting edge.

A pair of mating dies for forming the pilot end of a drilling fastener therebetween in a cold forging process is provided wherein each mating die comprises a portion disposed for forming a cutting surface on a workpiece by forcing the dies together against the workpiece during the forging process, the surfaces terminating at a mating surface of the dies a protruding portion arcuate in cross-section extends from the cutting surface forming portion adjacent the mating surface for forming a groove in the fastener cutting surface, during the cold forging process.

BRIEF DESCRIPTION OF THE DRAWING

Reference is made to the accompanying drawing in which there is shown an illustrative embodiment of the invention from which its novel features and advantages will be apparent, wherein:

FIG. 1 is a fragmentary elevational view of a drilling and thread forming fastener constructed in accordance with the teachings of the subject invention;

FIG. 2 is an elevational view showing the fastener of FIG. 1 rotated through 90°;

FIG. 3 is an end view taken on an enlarged scale, showing further details of the fastener depicted in FIG. 1 and FIG. 2;

FIG. 4 is a prospective view showing an end portion of the fastener of FIG. 1 and FIG. 2 in detail;

DESCRIPTION OF A PREFERRED EMBODIMENT

Figure 5:
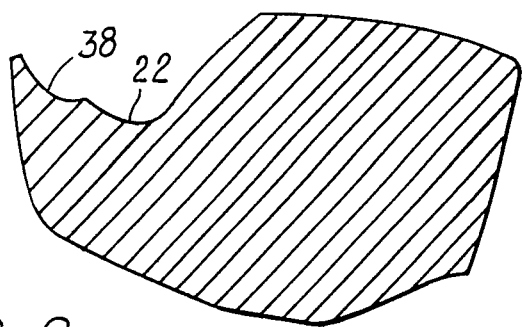
FIG. 5 is an enlarged sectional view taken along the line V—V of FIG. 1 in detail.

Referring now to the drawing and in particular to FIGS. 1–4 there is shown a drilling and thread forming fastener 10 having a shank 12 on which a continuous thread 14 is formed, and a pilot end 16. The fastener 10 is substantially symmetrical about the centerline of the shank 12, however, having a transverse major axis x—x and a transverse minor axis y—y intersecting at the centerline of the pilot end 16. A pair of flutes 18 and 20 are formed in the pilot end 16 and extend longitudinally over the length of the pilot end to form a pair of cutting surfaces 22, 24 extending along the major axis and in general defining the extent of the major axis of the fastener at any section thereof.

Each of the cutting surfaces 22 and 24 terminates in a cutting edge 26, 28 which forms an acute angle with the centerline of the fastener 10. The cutting edge 26, 28 is disposed for preliminary entry into the metal surface to provide a lead for the pilot end 16 of the fastener.

Each of the flutes 18, 20 further serves to define a pair of lands 30, 32 which are concentric with the centerline of the shank 12. The lands each have an arcuate surface 34, 36 projecting outwardly to define the minor axis at its radial extent on any cross-section of the pilot end 16.

As shown in FIGS. 1-4, the fastener 10 is provided with a pair of linear grooves 38, 40 formed in the cutting surface 22 or 24 adjacent the cutting edge 26 or 28 respectively. In the embodiment shown, the linear groove 38, 40 extends over the entire length of the respective cutting edge 26 or 28.

Figure 6:
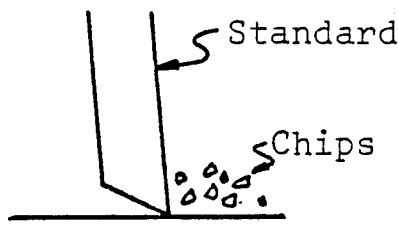
FIG. 6 is a schematic view showing a prior art fastener during application.
Figure 7:
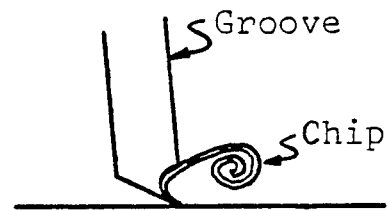
FIG. 7 is a schematic view similar to FIG. 6 showing the fastener of FIG. 1 and FIG. 2 during application.

Referring to FIG. 5, the groove 38 is shown to be arcuate in cross-section and is not restricted to being a true circular arc. The effect of the linear groove 38 or 40 is to produce a continuous chip, as best shown in FIG. 7 rather than a plurality of small chip segments, which are produced by fasteners of the prior art (shown in FIG. 6), thereby providing a chip which will flow smoothly through the flute 18 or 20 and from the hole being drilled by the fastener.

In forming the groove 38, in order to maintain the integrity of the fastener is has been found that the groove depth D should be approximately from 15 percent to 40 percent of the web thickness W, as shown in FIG. 3.

Figure 8:
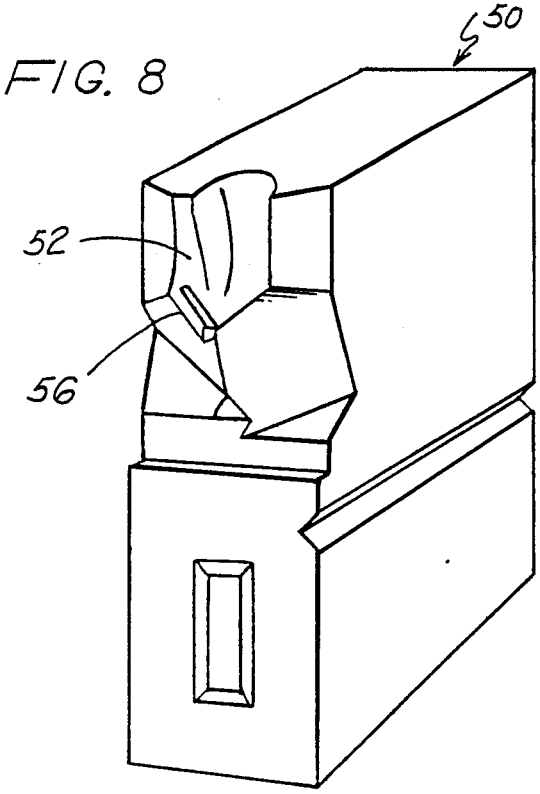
FIG. 8 is an elevational perspective view showing one of a pair of mating dies employed in forming the fastener of FIG. 1 and FIG. 2.

Referring now to FIG. 8, there is shown a die 50 which is one of a pair of mating dies employed to produce the fasteners shown in FIGS. 1-4. The die 50 is similar to that shown in the aforementioned U.S. Patent to Skierski, but incorporates the improvement providing a fastener described with references to FIGS. 1-7.

The die 50 comprises a portion 52 disposed for forming the cutting surface 22 on a workpiece and related surface for forming the pilot end 16 of the fastener in a forging process, which is well-known in the art.

In order to accomplish the objective of the present invention, the surface 52, and its similar surface on the mating die is provided with a protruding portion 54 arcuate in cross-section, which extends from the cutting surface forming portion 52 and is effective to produce the linear groove 38 when the pilot end is formed in a fastener during the cold forging process. In the embodiment shown, the surface 52 terminates at a mating surface of the die cooperating with the die 50 at a linear portion 56 and the protruding portion 54 extends along the line of the mating surface in order to produce the groove 38 (or groove 40) in the fastener 10 described with reference to FIGS. 1-4.

It has been found with the structure hereinbefore described that the linear groove 38 or 40 provided in the cutting surface 22 or 24 of the pilot end 16 is effective to produce a planing action due to the low lip relief angle, and thereby exhibits improved performance of faster drilling time. The cutting surface 22 or 24 having the linear groove 38 or 40 respectively formed therein creates a scooping action at the extremity of the drill tip which is extremely effective in the initial stage of drilling.

As further described with reference to FIGS. 6 and 7, the linear groove 38, 40 formed in the cutting surface 22 or 24, respectively, produces a continuous chip which serves as a mechanism for drawing the point through the material being drilled, thereby exhibiting improved performance and faster drilling times.

What is claimed is:

1. A drilling and thread forming fastener comprising a threaded shank and a pilot end having a pair of transverse axes intersecting at the centerline of said fastener, a pair of flutes extending longitudinally over said pilot end to form a pair of cutting surfaces, in cross-section defining one of said axes and terminating in a cutting edge, said flutes further forming a pair of lands concentric with the centerline of said shank, each land having an arcuate surface extending outwardly to define the other of said axes at its radial extent on any cross-section of said pilot end, and a linear groove arcuate in cross-section formed in each said cutting surface adjacent to said cutting edge, wherein said groove extends over the entire length of said cutting edge and has a depth of from about 15 to about 40 percent of the distance between said cutting edges.

2. A drilling and thread forming fastener as set forth in claim 1 wherein said axis defined by said cutting surfaces is of greater magnitude than said axis defined by said arcuate surfaces of said lands.

3. A drilling and thread forming fastener as set forth in claim 1 wherein each said cutting edge is disposed at an acute angle with said centerline.

* * * * *